Sept. 15, 1931.  T. T. POPE  1,823,164
CHUCK FOR PAPER ROLLS
Filed Oct. 25, 1927
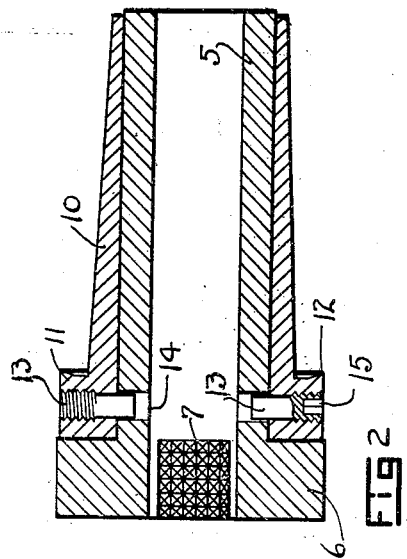
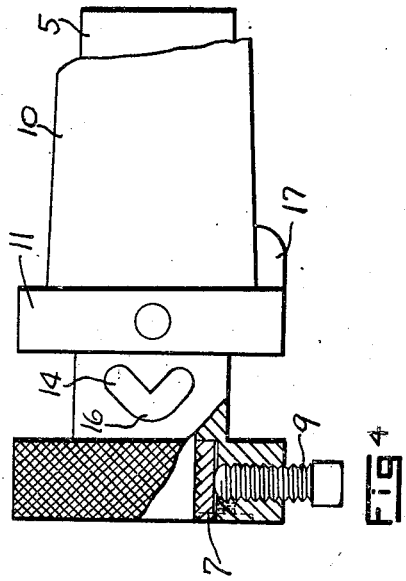
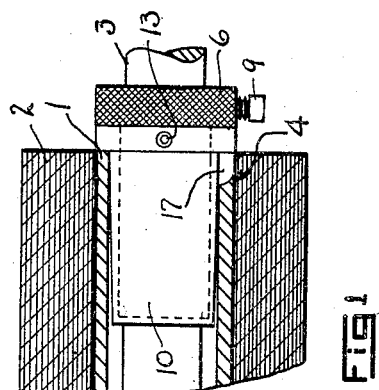
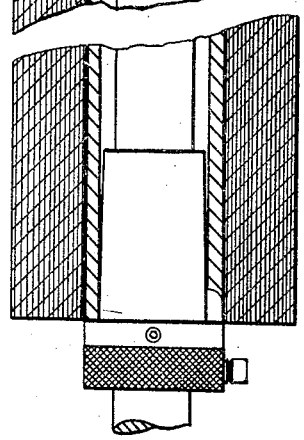
Turner T. Pope Inventor
By Jesse R. Stone
Attorney Patented Sept. 15, 1931

1,823,164

UNITED STATES PATENT OFFICE

TURNER T. POPE, OF HOUSTON, TEXAS, ASSIGNOR OF ONE-HALF TO G. L. MIMS, OF HOUSTON, TEXAS

CHUCK FOR PAPER ROLLS

Application filed October 25, 1927. Serial No. 228,583.

My invention relates to chucks to grip and clamp a roll of print paper, or the like, to a shaft from which it is unreeled in use.

In printing presses, where my invention finds its most common use, the paper is in the form of a long web wound upon a core and it is mounted upon a shaft and a chuck is employed to secure the roll of paper to the shaft. The shaft is allowed to rotate when the paper is fed to the press.

Some difficulty is experienced in providing a chuck which can be quickly operated and which will hold the roll clamped to the shaft even under high tension and it is an object to provide a chuck which will overcome this difficulty.

It is desired that the chuck be automatically adjustable to grip the roll firmly when tension is exerted in either direction thereon, so that the chucks may be employed at either end of the roll.

It is also an aim to provide means to quickly grip the chuck to a smooth shaft without mutilating the said shaft in use.

Referring to the drawings herewith, Fig. 1 is a broken side elevation of a shaft with my chucks thereon and a paper roll thereon, said roll being in central vertical section. Fig. 2 is a central longitudinal section of one of the chucks. Fig. 3 is an end view of the chuck. Fig. 4 is a broken side elevation with some parts broken away for greater clearness.

The paper roll usually consists of a central core 1 with the web of paper 2 wound thereon. Said core fits loosely upon the shaft 3 which may be mounted for rotation in any desired manner, not shown. Each end of the core, which is usually of a heavy pasteboard, is formed with a notch or slot 4 formed to receive a co-operating member on the chuck which will be presently described.

Chucks are employed at both ends of the roll. Each chuck comprises an inner mandrel 5 shaped to fit closely upon the shaft. This mandrel is a sleeve, cylindrical in shape with a radially extending head 6 on one end, the outer surface of which may be knurled to better serve as a hand hold.

The inner surface of the head 6 is recessed to receive a toothed plate 7. The recess is undercut, or morticed to limit the inward movement of the plate and a screw 8 in the end of the head overlaps the plate at the outer end sufficiently to prevent removal of the plate from its recess until the said screw is removed. This plate is adapted to be moved into clamping engagement with the shaft 3 by means of a set screw 9 extending radially through the head, as shown in Fig. 4. It will be obvious that the chuck will be introduced into the end of the roll and when thus engaged with the roll, the chuck will be secured rigidly to the shaft by the screwing up of the set screw 9.

On the outer surface of the mandrel 5 is a tapered sleeve 10. Said sleeve has a head 11 fitting against the head 6 of the mandrel, said head having on its forward side a sharpened outer edge 12 formed by dishing the inner face of the head 11. The sleeve 10 is rotatable upon the mandrel 5 and is limited in the extent of its rotation by means of pins 13 which are screwed radially through the head 11 from opposite sides of the said head and adapted to project into slots or openings 14 in the mandrel. These pins are threaded on their outer ends to screw within the head, the inner ends being smooth and adapted to project part way through the thickness of the mandrel 5 within the slots 14. A squared recess, indicated at 15, is formed in the heads of these pins to receive a wrench.

The slots 14 in the mandrel are angular in shape, as shown in Fig. 4, and it will be noted that when the sleeve 10 is rotated on the mandrel 5, the pins 13 will slide within the slot 14 so that when moved in either direction from a central point 16, the pin will be moved forwardly so as to force the sleeve 10 inwardly against the roll of paper.

There is a forwardly extending lug 17 formed on one side of the sleeve 10 adjacent the head 11, said lug being adapted to fit within the slot or recess 4 in the core 1 of the roll.

In assembling the chuck, the threaded pins 13 will be withdrawn in the head sufficiently to allow the sleeve to be fitted over the mandrel 5. The pins will then be screwed in place so as to engage within the openings 14, as shown in Fig. 2. When the paper roll has been moved on to the shaft 3 a chuck will be moved along the shaft so as to engage within each end of the roll with the lugs 17 fitting within the recess 4 in the core. The sharp forward edge 12 upon the head of the sleeve will fit around the outer side of the core and within the first few windings of the paper and will serve to grip the same firmly at each end. When in this position, the set screw 9 upon the mandrel will be screwed down tightly to force the jaws 7 frictionally against the shaft and hold the mandrel rigidly in place. When the paper is thereafter unreeled from the roll, the ordinary tension upon the paper will tend to hold the pins 13 about centrally of the slot 14 in the mandrel. When further tension is exerted upon the web which might tend to disengage the roll from the chuck, the sleeve 10 will tend to rotate upon the mandrel and force the pins 13 toward the end of the slot on an inclination such as to move the sleeves 10 inwardly and more firmly engage the roll and thus prevent relative rotation due to the increased tension. The slots 14 are inclined inwardly in both directions so as to make it possible to use the chuck at either end of the roll interchangeably and thus necessitate the use of but one type of chuck. Furthermore, it sometimes becomes desirable to use the device in a reverse direction, and in such case, the action is the same as in the forward direction.

The advantages of the structure lie in the fact that the chuck is easily inserted in position in the ends of the roll and securely gripped to the shaft without the necessity of any co-operating part upon the shaft 6, the engagement of the jaws 7 being entirely sufficient to hold the chuck rigidly against the shaft. The automatic arrangement whereby the chuck will grip the roll more firmly under increased tension is of particular value and the simplicity of the structure disclosed makes the device economical to manufacture and use.

Having thus described the invention, what I claim as new is:

A chuck for securing rolls of paper upon a shaft, comprising a mandrel adapted to fit said shaft, means to fix said mandrel to said shaft, a tapered sleeve on said mandrel, said mandrel having an L-shaped slot therein with the ends thereof inclined forwardly, and a pin on said sleeve fitting within said slot and limiting the rotation of said sleeve thereon in the manner described.

In testimony whereof I hereunto affix my signature this 21st day of October, A. D. 1927.

TURNER T. POPE.